(12) United States Patent
Fathy et al.

(10) Patent No.: US 12,487,677 B2
(45) Date of Patent: Dec. 2, 2025

(54) DIGITALLY ASSISTED SENSOR RECORDING CIRCUIT WITH CONTINUOUS OFFSET CANCELLATION

(71) Applicant: THE REGENTS OF THE UNIVERSITY OF CALIFORNIA, Oakland, CA (US)

(72) Inventors: Nader Fathy, La Jolla, CA (US); Patrick Mercier, La Jolla, CA (US)

(73) Assignee: The Regents of the University of California, Oakland, CA (US)

(*) Notice: Subject to any disclaimer, the term of this patent is extended or adjusted under 35 U.S.C. 154(b) by 52 days.

(21) Appl. No.: 18/694,280

(22) PCT Filed: Sep. 23, 2022

(86) PCT No.: PCT/US2022/044505
§ 371 (c)(1),
(2) Date: Mar. 21, 2024

(87) PCT Pub. No.: WO2023/049325
PCT Pub. Date: Mar. 30, 2023

(65) Prior Publication Data
US 2025/0138633 A1    May 1, 2025

Related U.S. Application Data

(60) Provisional application No. 63/247,889, filed on Sep. 24, 2021.

(51) Int. Cl.
  *G06F 3/01* (2006.01)
  *H03M 1/66* (2006.01)
(52) U.S. Cl.
  CPC ............ *G06F 3/015* (2013.01); *H03M 1/662* (2013.01)

(58) Field of Classification Search
  CPC ............................. G06F 3/015; H03M 1/662
  (Continued)

(56) References Cited

U.S. PATENT DOCUMENTS 11,278,226 B2 * 3/2022 Heydari ................... G06F 3/01
2014/0094674 A1   4/2014 Nurmikko et al.
(Continued)

FOREIGN PATENT DOCUMENTS

KR          102076627 B1    2/2020

OTHER PUBLICATIONS

Denison, et al., "A 2 W 100 nV/rtHz Chopper-Stabilized Instrumentation Amplifier for Chronic Measurement of Neural Field Potentials", IEEE Journal of Solid-State Circuits, 2007, vol. 42, No. 12, pp. 2934-2945.
(Continued)

*Primary Examiner* — Calvin C Ma
(74) *Attorney, Agent, or Firm* — Greer, Burns & Crain, Ltd.; Steven P. Fallon

(57) ABSTRACT

A method for obtaining neural signals from a neural signal sensor includes extracting sensor offset from a neural input signal. Sensor offset is removed from N-channels that share a single amplifier. The neural input signal is acquired from the analog domain by neural electrodes with varying DC-offset and the method includes multiplexing the N-channels via a time divisional multiple access procedure into a single neural amplifier An integrated digitally assisted neural recording system includes an analog multiplexer structured to receive N-channels and to multiplex the N-Channels into a single neural amplifier. A feedback loop is configured to cancel electrode offset voltage in the digital domain by generating electrode offset voltage samples and adding delay to align each electrode offset voltage sample to be subtracted at the neural amplifier in the analog domain.

14 Claims, 10 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2020/0192478 A1* | 6/2020 | Alcaide | G06F 3/0304 |
| 2020/0259465 A1 | 8/2020 | Wu et al. | |
| 2020/0306539 A1* | 10/2020 | Kim | A61N 1/3787 |
| 2020/0367749 A1 | 11/2020 | Nurmikko et al. | |

OTHER PUBLICATIONS

Fan, et al., "A 1.8 μW 1 μV-Offset Capacitively-Coupled Chopper Instrumentation Amplifier in 65nm CMOS", Proceedings of ESSCIRC, 2010, pp. 170-173.

Fatima, et al., "Intra-cortical brain-machine interfaces for controlling upper-limb powered muscle and robotic systems in spinal cord injury", Clinical Neurology and Neurosurgery, 2020, vol. 196, pp. 1-10.

Ha, et al., "Silicon-Integrated High-Density Electrocortical Interfaces", Proceedings of the IEEE, 2017, vol. 105, No. 1, pp. 11-33.

Harrison, et al., "A Low-Power Low-Noise CMOS Amplifier for Neural Recording Applications", IEEE Journal of Solid-State Circuits, 2003, vol. 38, No. 6, pp. 958-965.

Jung, et al., "A 2.7-μW Neuromodulation AFE With 200 mVpp Differential-Mode Stimulus Artifact Canceler Including On-Chip LMS Adaptation", IEEE Solid-State Circuits Letters, 2018, vol. 1, No. 10, pp. 194-197.

Kuan, et al., "Wireless Gigabit Data Telemetry for Large-Scale Neural Recording", IEEE Journal of Biomedical and Health Informatics, vol. 19, No. 3, pp. 949-957.

Muller, et al., "A 0.013mm2 5 μW DC-Coupled Neural Signal Acquisition IC with 0.5V Supply", ISSCC, Biomedical & Displays, Session 17.2, 17.2, 2011, pp. 302-304.

Perez-Prieto, et al., "A 32-Channel Time-Multiplexed Artifact-Aware Neural Recording System", IEEE Transactions on Biomedical Circuits and Systems, 2021, vol. 15, No. 5, pp. 960-977.

Ranjandish, et al., "Walsh-Hadamard-Based Orthogonal Sampling Technique for Parallel Neural Recording Systems", IEEE Transactions on Circuits and Systems—I: Regular Papers, 2021, vol. 68, No. 4, pp. 1740-1749.

Schwarz, et al., "Chronic, wireless recordings of large-scale brain activity in freely moving rhesus monkeys", Nature Methods, 2014, vol. 11, No. 6, pp. 670-679.

Sharma, et al., "Verification of a Rapidly Multiplexed Circuit for Scalable Action Potential Recording", IEEE Transactions on Biomedical Circuits and Systems, vol. 13, No. 6, pp. 1655-1663.

Uehlin, et al., "A 0.0023 mm2/ch. Delta-Encoded, Time-Division Multiplexed Mixed-Signal ECoG Recording Architecture With Stimulus Artifact Suppression", IEEE Transactions on Biomedical Circuits and Systems, vol. 14, No. 2, pp. 319-331.

Warchall, et al., "Robust Biopotential Acquisition via a Distributed Multi-Channel FM-ADC", IEEE Transactions on Biomedical Circuits and Systems, vol. 13, No. 6, pp. 1229-1242.

International Search Report from the corresponding International Patent Application No. PCT/US2022/044505, dated Jan. 31, 2023.

* cited by examiner

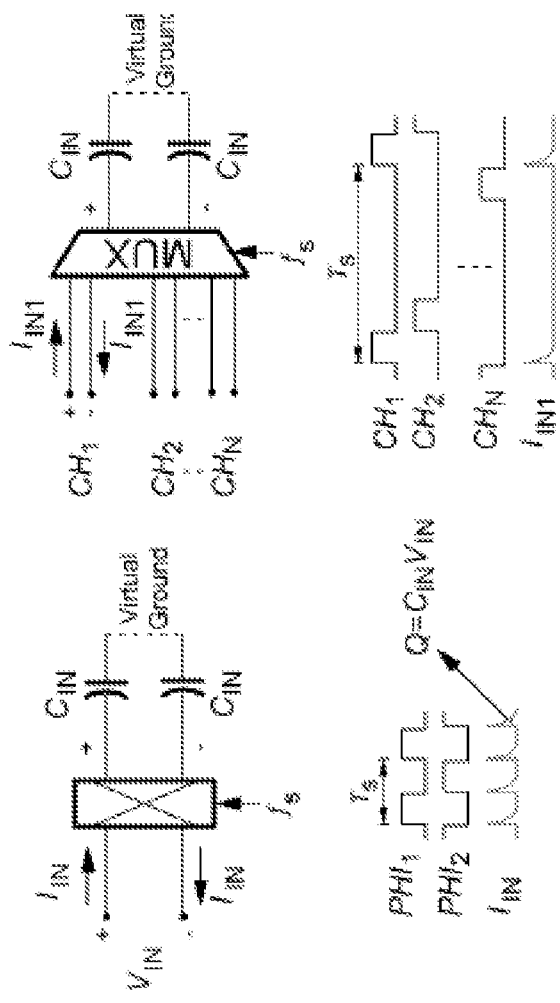
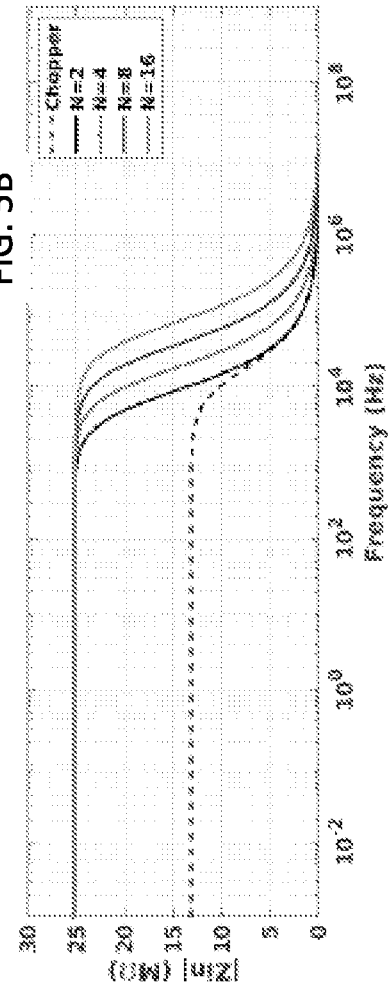
FIG. 5A
FIG. 5B
FIG. 5C

DIGITALLY ASSISTED SENSOR RECORDING CIRCUIT WITH CONTINUOUS OFFSET CANCELLATION

PRIORITY CLAIM AND REFERENCE TO RELATED APPLICATION

The application claims priority under 35 U.S.C. § 119 and all applicable statutes and treaties from prior U.S. provisional application Ser. No. 63/247,889 which was filed Sep. 24, 2021.

FIELD

Fields of the invention include integrated circuits, sensing systems, and interference cancelling. A specific application of the invention is to a neural sensing system that includes high-density neural implant sensors for studying the complicated dynamics of the human brain.

TABLE OF ACRONYMS

The following acronyms are used in the description.
AC Alternating Current
ADC Analog to Digital Converter
AF Adaptive Filter
AFE Analog Front End
AMS Analog Mixed Signal
AP Action Potential
BMI Brain Machine Interface
CDMA Code Division Multiple Access
CMFB Common Mode Feedback
CMMR Common Mode Rejection Ratio
CMOS Complementary Metal Oxide Semiconductor
CDAC Capacitive Digital to Analog Converter
CNT Carbon Nanotube
DAC Digital to Analog Converter
DC Direct Current
DEMUX Demultiplexer
DSP Digital Signal Processor
EEG Electroencephalogram
ENOB Effective Number of Bits
EOV Electrode Offset Voltage
FDMA Frequency Divisional Multiple Access
FLL Frequency-Locked Loop
HDNI High-Density Neural Implant
HDNP High-Density Neural Pixel
IC Integrated Circuit
IIR-Filter Infinite Impulse Filter
IRN Input Referred Noise
kHz Kilohertz
LFP Local Field Potential
LMS Least-Mean-Squares
LP CMOS Low Power CMOS
LPF Low Pass Filter
LSB Least Significant Bit
MSB Most Significant Bit
MUX Multiplexer
NEF Noise Efficiency Factor
PSSR Power Supply Rejection Ratio
RF Radio Frequency
SAC Successive Approximation Register
SoC System-on-chip
TDMA Time Division Multiple Access
µECoG Micro Electrocorticogram

BACKGROUND

BMIs have succeeded in decoding neural signals from the brain's cerebral cortex and have translated it into useful data for use in prosthetic applications. Fatima, et al., "Intracortical brain-machine interfaces for controlling upper-limb powered muscle and robotic systems in spinal cord injury," Clinical Neurology and Neurosurgery, vol. 196, 2020. Movement of a limb can be restored by recording from 10,000 neurons simultaneously, but 100,000 real-time neural recordings are predicted to be able to restore movement of the entire body. David A Schwarz, et. al., "Chronic, wireless recordings of large-scale brain activity in freely moving rhesus monkeys," Nature Methods, vol. 11, no. 6, pp. 670-679 (2014). It is immensely challenging to integrate this large number of channels on fully integrated implantable SoCs.

A critical challenge to develop an HDNI system is the requirement of small channel area, because area tends to trade off with other important parameters such as noise, power, and offset blocking capabilities. Sohmyung Ha, et. al., "Silicon-Integrated High-Density Electrocortical Interfaces," Proceedings of the IEEE, vol. 105, no. 1, pp. 11-33 (2017). Neural LFP signal contents of (1-300 Hz) lie in the flicker noise band, while thermal noise affect the neural AP signal of frequencies (0.3-10 kHz). Muller, et al., "A 0.013 mm2, 5 µW, DC-Coupled Neural Signal Acquisition IC with 0.5 V Supply," IEEE JSSC, vol. 47, no. 1, pp. 232-243 (2012).

Flicker noise has been resolved by employing a large-area input differential pair amplifier. Reid R. Harrison, and Cameron Charles, "A Low-Power Low-Noise CMOS Amplifier for Neural Recording Applications," IEEE JSSC, vol. 38, no. 6, pp. 958-965 (2003) Another approach is a chopper-stabilized instrumentation amplifier (IA), which requires a wide-bandwidth amplifier. Tim Denison, et. al., "A 2 µW 100 nV/√Hz Chopper-Stabilized Instrumentation Amplifier for Chronic Measurement of Neural Field Potentials," IEEE JSSC, vol. 42, no. 12, pp. 2934-2945, (2007). Additional feedback loops to cancel up-converted electrode offsets and chopper ripples, which require additional chip area. Fan, et al., "A 1.8 W 60 nV/sqrt (Hz) Capacitively-Coupled Chopper Instrumentation Amplifier in 65 nm CMOS for Wireless Sensor Nodes," IEEE JSSC, vol. 46, no. 7, pp. 1534-1543 (2011). The thermal noise issue can be solved by increasing the transconductance of the input differential pair of the neural amplifier, which requires high power consumption and/or large area utilization. The AFE module is still far behind in terms of development in the pursuit of creating a true HDNI system. Yen-Cheng Kuan, Yi-Kai Lo, Yanghyo Kim, Mau-Chung Frank Chang, and Wentai Liu, "Wireless Gigabit Data Telemetry for Large-Scale Neural Recording," IEEE Journal of Biomedical And Health Informatics, vol. 19, no. 3, pp. 949-957 (2015).

Conventional multi-channel neural signal acquisition systems use a look-up table from a memory and use periodic look-up operations to remove the value offset indicated as suitable via the stored values. Such a look-up operation does not permit continuous offset cancellation and is not very non-practical.

FIG. 1 (prior art) show typical neural recording systems with different approaches in part (a) and part (b). In part (a), each electrode has its own dedicated analog interface. Part (b) shares the analog interface among multiple electrodes. The part (b) approach shares via a TDMA and has been described to have resulted in per-channel areas of 0.004 and 0.0023 mm². See, Mohit Sharma, et. al., "Verification of a Rapidly Multiplexed Circuit for Scalable Action Potential Recording," *IEEE TBCAS*, vol. 13, no. 6, pp. 1655-1663 (2019); John P. Uehlin, et. al, "A 0.0023 mm2/ch. Delta-Encoded, Time-Division Multiplexed Mixed-Signal ECOG Recording Architecture With Stimulus Artifact Suppression," IEEE TBCAS, vol. 14, no. 2, pp. 319-331, 2020. However, multiple coarse and fine-tuning DACs, memory modules, were employed off-chip. Unfortunately, in a TDMA system, the input multiplexed signal to the AFE translates slowly varying EOV into a higher frequency component that is equal to the multiplexer sampling speed. This forces all channel multiplexed EOV to pass through the AFE input with full amplitude even if an AC-capacitor or a regular DC-servo loop is used. Accordingly, the multiplexed EOVs saturate the AFE.

EOV behavior is not constant because EOVs tend to have some low frequency content from DC-0.2 Hz. As a result, static DC-cancellation approaches used in Muller et al. and Sharm et al., supra, are not robust in real-world conditions unless the digital cancellation calibration routine is rerun in the foreground periodically. Additionally, in case of using a binary-search algorithm to remove the slowly varying EOV, the cutoff frequency between LFP and AP becomes unknown, and the offset is removed abruptly, which can lead to distortion in the acquired neural signal.

FDMA has been used in distributed EEG systems to share the ADC among all recording channels, and in implanted neural recording systems to share the RF-module. Warchall et al, "Robust Biopotential Acquisition via a Distributed Multi-Channel FM-ADC," IEEE TBCAS, vol. 13, no. 6, pp. 1229-1242 (2019); William Biederman, et. al., "A Fully-Integrated, Miniaturized (0.125 mm²) 10.5 µW Wireless Neural Sensor," *IEEE JSSC*, vol. 48, no. 4, pp. 960-970, (2013). Such systems require on-chip demodulation to filter out the EOV from each channel. Typical demodulation circuits include high overhead components, such as an FLL, modulators and demodulators.

CDMA for analog interfaces suffer from two main problems. The first problem is the inability to use the coding-choppers to reduce the amplifier flicker noise. This is because an analog LPF after each decoded channel is normally essential to attenuate the up-modulated flicker noise and offset of the amplifier prior to digitization by the ADC. Accordingly, demodulation needs to be on the analog side instead of the digital side which adds undesired area per channel. The second problem with CDMA is using a digital-like coding scheme in an AMS system. CDMA expects a constant input during the entire code length period to cancel crosstalk completely. However, when CDMA-chips code an analog waveform that is slightly changing over time during the code period, it results in slight delta-errors each time the coded signal is sampled. This can create high input referred noise in a neural recording system. A sample-and-hold can be used at the input of the AFE to reduce such noise but requires an increased per-channel area due to kT/C noise. Reza Ranjandish and Alexandre Schmid, "Walsh-Hadamard-Based Orthogonal Sampling Technique for Parallel Neural Recording Systems," *IEEE TCAS—I: REGULAR PAPERS*, vol. 68, no. 4, pp. 1740-1749 (2021).

TDMA requires comparatively minimal overhead. An AFE multiplexer can have a simple equivalent digital demultiplexer in the back-end to recover the input neural signals. Mohit Sharma, et. al., "Verification of a Rapidly Multiplexed Circuit for Scalable Action Potential Recording," IEEE TBCAS, vol. 13, no. 6, pp. 1655-1663 (2019). Only a single neural amplifier of bandwidth (2×$f_s$×N), where $f_s$ is the neural signal BW, is sufficient to amplify the multiplexed neural signals. A Nyquist ADC with a sampling rate similar to the neural amplifier bandwidth can be used. While TDMA enables a comparatively very compact overall implementation, each electrode in a neural recording system can have a different (time-varying) offset voltage. This creates a risk that the TDMA system can saturate the front end in a small area, even when AC coupling capacitors are employed.

In general, removal of EOV for a multiple access system poses significant challenges. Since each channel has its own isolated random time varying EOV, depending on the multiple access scheme used, the EOV at the amplifier input can change. For example, in FDMA and CDMA, the systems depend on adding the modulated channels on a single summing node which causes total EOV to be multiplied by sqrt (N) at the input of the neural amplifier. In contrast, in TDMA systems, each channel has its own isolated time varying EOV which, given a perfect back end, can be individually cancelled at each measurement iteration.

Some prior approaches use a binary search algorithm to remove EOV. See, Sharma et al., supra. Another approach is a mix of an IIR-filter and binary search algorithm for partial dynamic EOV removal. See, Muller et al., supra. The transfer function of a required low-pass filter is difficult to optimize because the gain coefficient of the LPF controls two coupled parameters: 1) the loop stability, and 2) the loop filter poles location. The stability becomes increasingly difficult if the ADC and DAC introduced delays higher than one unit-delay.

SUMMARY OF THE INVENTION

A preferred embodiment provides an integrated digitally assisted neural recording system. The system includes an analog multiplexer structured to receive N-channels and to multiplex the N-Channels into a single neural amplifier. An analog to digital converter is configured to convert a signal from the neural amplifier. A demultiplexer is configured to separate a digital output of the analog to digital converter back into the N-channels. A feedback loop from the demultiplexer to the neural amplifier is configured to cancel electrode offset voltage by generating electrode offset voltage samples and adding delay to align each electrode offset voltage sample to be subtracted at the neural amplifier in the analog domain.

A method for obtaining neural signals from a neural signal sensor includes extracting sensor offset from a neural input signal. Sensor offset is removed from N-channels that share a single amplifier. The neural input signal is acquired from the analog domain by neural electrodes with varying DC-offset and the method includes multiplexing the N-channels via a time divisional multiple access procedure into a single neural amplifier.

BRIEF DESCRIPTION OF THE DRAWINGS

FIGS. 5A-5C compare input impedance simulation results of a chopper-based AFE versus a different number of TDMA-based AFEs;

DETAILED DESCRIPTION OF THE PREFERRED EMBODIMENTS

Preferred embodiments provide an integrated digital system that extracts the sensor offset from an input signal and removes it simultaneously from N-channels that share a single amplifier. This allows the integration of the system on a very small area on chip. A particular preferred embodiment is a CMOS-based integrated circuit SoC that senses brain neural signals such as LFP and AP. It uses an integrated digital system that extracts the electrodes offset from the input signal and simultaneously removes it from 16-Channels that share a single neural amplifier. This allows the integration of the system on a very small area on chip compared to conventional systems.

Preferred systems are mostly digital and highly scalable with CMOS process technology. Preferred architectures enable high-density channel systems.

In a preferred system, the neural signal is acquired from the analog domain by neural electrodes with a large slowly varying DC-Offset. N-channels, e.g. 16-channels are multiplexed in a TDMA manner to share a single amplifier, which reduces the area of the SoC. Initially, the differential neural amplifier saturates due to this large offset, hence the desired neural signal cannot be obtained from all 16-channels. The saturated output is digitized with a 10 bit SAR ADC sampling at 320 kHz. In the digital domain, all channels are demultiplexed in the TDMA Signal-Recovery Module. The output signals are then passed to the TDMA offset-Cancelling Module to 16-digital-accumulators, one for each channel. The accumulators sense the slowly varying DC-Offset acting as LPFs, then the outputs are multiplexed again in the digital domain and passes through an LMS filter with multi-positive feedbacks for simultaneous dynamic-electrode-offset cancellation. LMS compares the generated offset in all channels simultaneously and the neural amplifier output; then it removes the offset from the desired signal. The removal of the electrode-offset is done through a 2nd order $\Delta\Sigma$ modulator 10-bit charge redistribution DAC connected to the amplifier input nodes. In less than 100 ms, the AMS system converges and the desired neural signal starts to appear for each channel at the recovery module output. LPFs attenuate the noise from each channel at the output.

A preferred prototype as an area of about 0.0025 mm$^2$ per active recording channel, 68% of which is the digital module and 32% is the analog module using 65 nm CMOS technology. Accordingly, this system is scalable and can go below 0.001 mm$^2$ with newer commercial technology nodes such as 7 nm or 5 nm, etc.

Preferred embodiments of the invention will now be discussed with respect to experiments and drawings. Broader aspects of the invention will be understood by artisans in view of the general knowledge in the art and the description of the experiments that follows.

Figure 1:
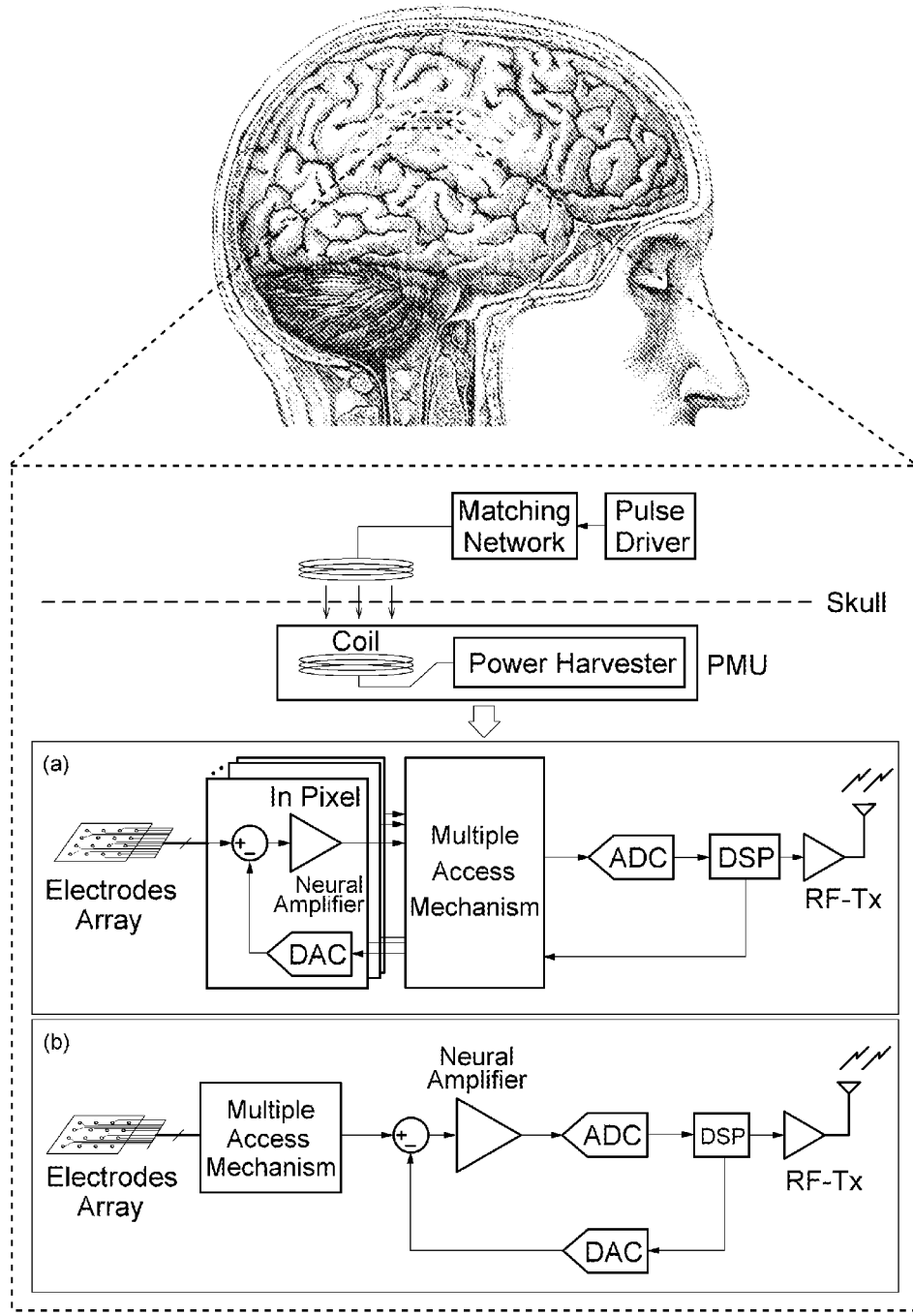
FIG. 1 (Prior Art) illustrates convention neural recording systems with (a) each electrode having its own dedicated analog interface and (b) the analog interface shared among multiple electrodes via a time division multiple access (TDMA) method.
Figure 2:
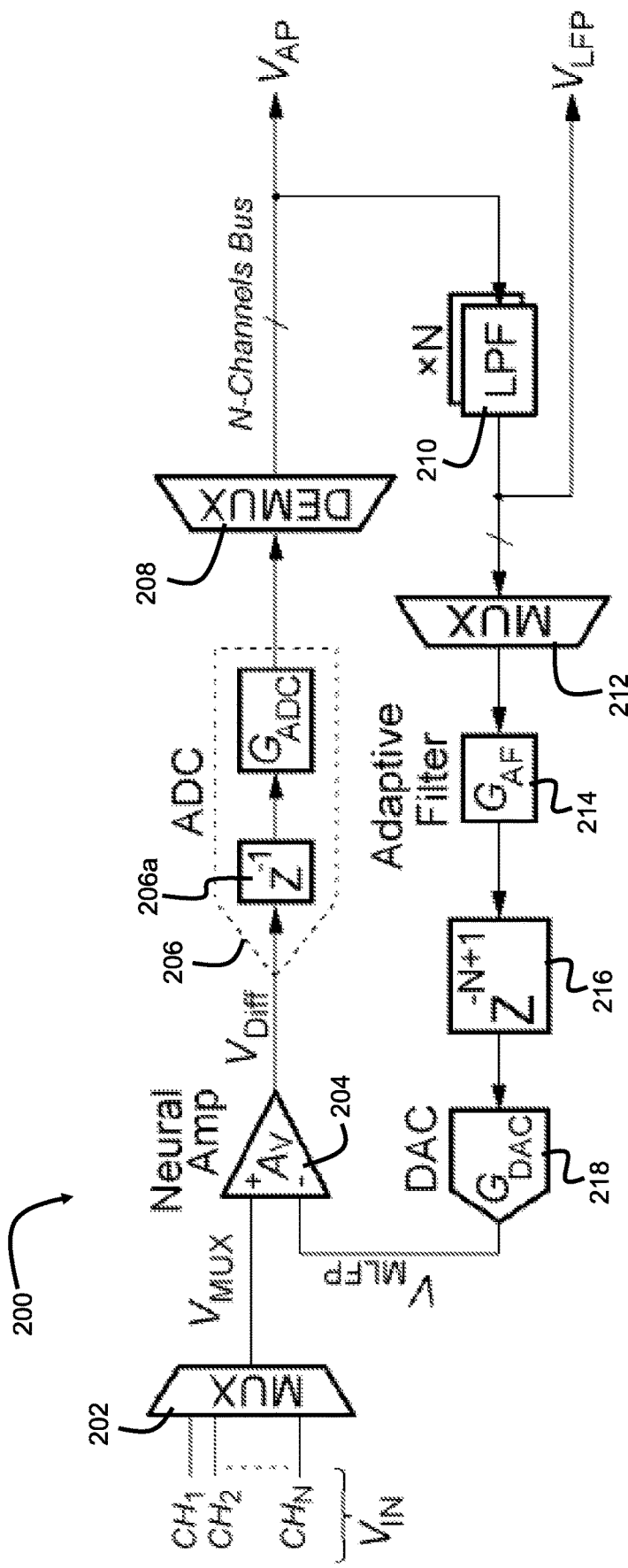
FIG. 2 is a block diagram of a preferred neural recording system for multi-access and simultaneous EOV cancellation across all channels.

FIG. 2 shows a preferred neural recording system 200 for multi-access and simultaneous EOV cancellation across all channels. The system uses an analog multiplexer 202 to multiplex all channels into a single neural amplifier 204 and ADC 206 with gain ($G_{ADC}$) and a DEMUX 208 to re-separate the N-channels. A feedback loop consists of N-LPFs 210, a MUX 212, and AF 214 with gain ($G_{AF}$), (N−1) delay units 216 and a DAC 218 with gain ($G_{DAC}$).

Each one of the N-channels is connected to an electrode when in a neural BMI and each electrode has a random EOV value. The system 200 uses MUX 202 to multiplex all channel offsets together. This operation creates a high-frequency EOV artifact could easily saturate an amplifier. The system 200 uses digital signal processing to cancel this artifact at the neural amplifier input nodes in a per-channel, time-multiplexed manner.

The ADC 206 adds a unit delay ($z^{-1}$) 206a, while the capacitive DAC 218 adds no delay since it is not clocked. Since TDMA is used, the cancellation of the EOV requires the additional (N−1) delay units to be inserted into the loop, which serves to align each EOV sample to be subtracted from its corresponding channel in the analog domain. The N-delay units 216 do not affect the cancellation functionality of the system because the ADC 206 and digital components are operating at a much higher frequency ($2 \times f_s \times N$) compared to the EOV frequency; hence, the slowly varying EOV is seen virtually constant with N-digital delay cycle. As mentioned above, the DAC 218 is not clocked, which means that whatever digital voltage applied on the capacitive DAC 218 is instantaneously converted into an analog signal. The ADC 206 is sampled by a clock (so at least one clock cycle is needed to convert analog to digital). The N-delay units 216 intentionally adds delay via flip-flops in the digital domain.

The additional N-delay cycles disturbs the stability of the loop. To make the loop stable, $G_{AF}$ 214 should be selected to be very small, taking into account the loop gain changes of the amplifier, ADC, and DAC due to process variations. $G_{AF}$ 214 is very small compared to its contribution to the system open-loop gain. When a block inside a loop has very high gain such that the phase margin drops below ~45 degrees, undesired oscillations might appear in the system affecting the stability. So "very small" with respect to the gain-contribution of all open loop blocks providing gain in the system while maintaining phase margin >60 degree.

This approach is difficult since an arbitrary small value of $G_{AF}$ will cause the loop response to be slower than the change of the EOV, which will lead to amplifier saturation. The addition of the adaptive filter 214 solves the issue by starting $G_{AF}$ starts from the largest possible gain value, in which the loop is in saturation, and then starts to decrease automatically until it locks to the largest possible value that guarantees cancellation of the EOV. This configuration ensures loop stability and high conversion speed. Specifically, the gain is controlled by Eq. (1) below via the adaptive filter 214 in FIG. 2. With Eq. (1) w[n] starts from its highest possible value depending on the digital register size in the particular system, then w[n+1] changes according to equation 1 and starts to decrease. Saturation can occur with very high $G_{AF}$ gain, with the output signal is either {min or max} of this digital signal (e.g., if we have 10b register, then the output is −512 or 511 for any input). Zero is a rare case, but mostly the output here is said to be saturated. This means that the loop is in saturation.

Neural signals, $V_{IN}$, for each channel are multiplexed 202 in the time domain at $V_{MUX}$, where the aggregated signal is then amplified 204 and digitized 206, and then demultiplexed 208 for low pass filtering at the $V_{LFP}$ node 210, which results in a sum of LFP and EOV signals. Finally, the low frequency signals are multiplexed 212 one more time and converted into the analog-domain for subtraction of EOV at the node $V_{MLFP}$. Experiments show that transient signals at $V_{MLFP}$ which are that the sum of EOV and LFP signals are almost static after N-delays.

Figure 3A:
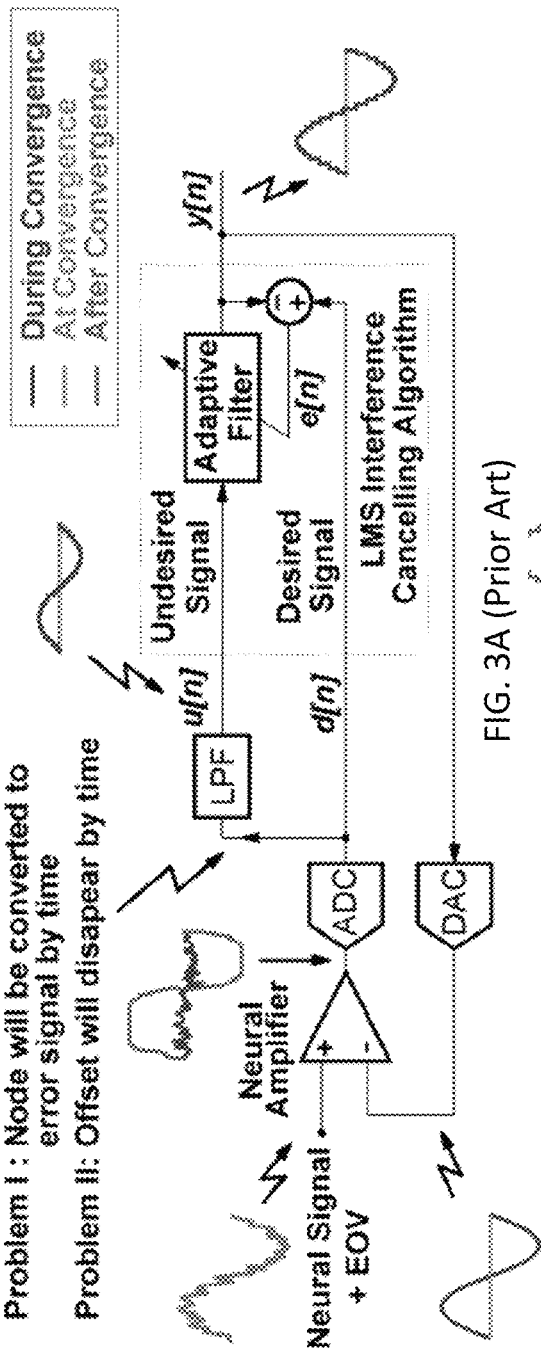
FIG. 3A (Prior Art) shows an example prior system in uses two LMS adaptive filters to remove stimulation artifacts from the recorded neural signal.

An LMS approach is often used to cancel interference in various systems. FIG. 3A shows an example prior system in uses two LMS adaptive filters to remove stimulation artifacts from the recorded neural signal. FIG. 3A is an equivalent block diagram of the first AMS loop of the system described in Seobin Jung, et. al., "A 2.7-µW Neuromodulation AFE With 200 mVpp Differential-Mode Stimulus Artifact Canceler Including On-Chip LMS Adaptation," *IEEE SSCL*, vol. 1, no. 10, pp. 194-197 (2018). In FIG. 3A, the neural signal with DC offset is amplified then digitized and applied to a LPF to extract DC offset. A standard LMS adaptive algorithm calculates an output y[n] based on the input signal u[n] and the error signal e[n].

Figure 3B:
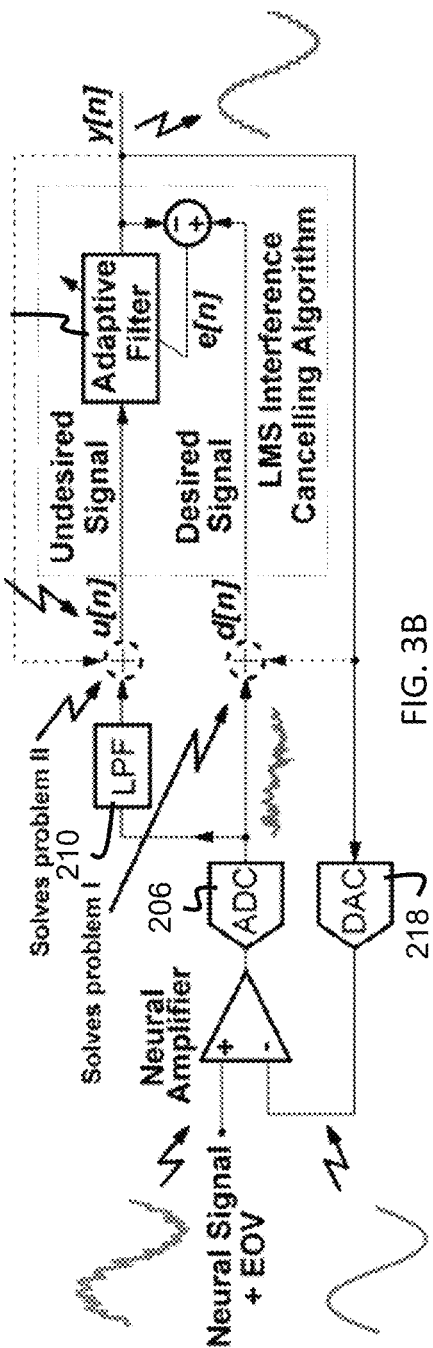
FIGS. 3B and 3C illustration a preferred LMS approach of the invention.
Figure 3C:
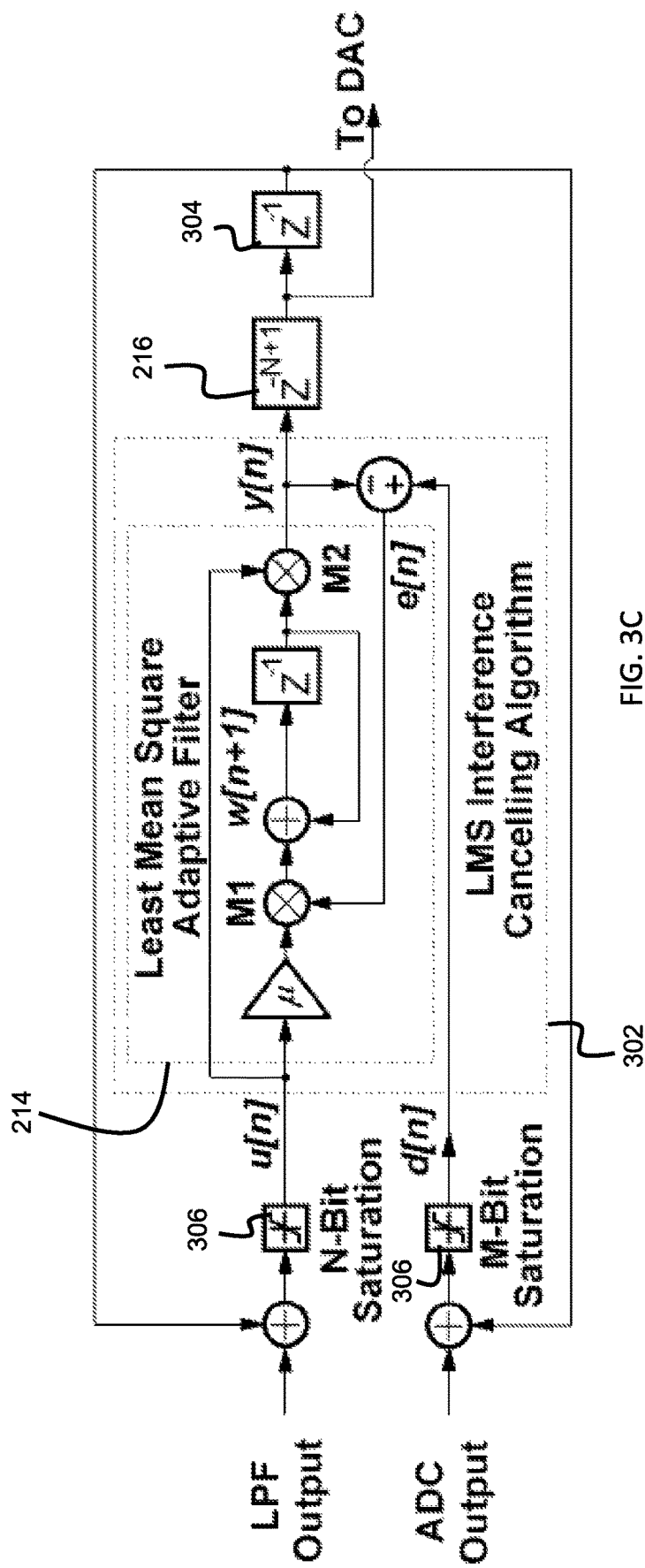

A different approach is implemented in the invention, as illustrated in FIGS. 3B and 3C, and performed by the digital controller 414. The preferred LMS algorithm is set to an interference cancelling mode by feeding the e[n] being the difference between a desired signal d[n], resulting from the ADC 206, and the output signal y[n]. Accordingly, the interference canceling algorithm follows $$w[n+1] = w[n] + \mu u[n](d[n] - y[n]) \quad (1)$$

where w[n] is the estimated AF weight. The undesired EOV signal u[n] is generated by applying the low pass filter 210 to the neural amplifier output, while µ is a constant set by the designer which controls speed and accuracy of the AF. The amplifier 204 output is the $V_{AP}$ of all N-channels multiplexed in time domain.

The extra digital LMS loop in FIG. 3B and FIG. 3C is employed due to a fundamental issue with this configuration that arises when a differential amplifier is used in feedback with an artifact cancelling LMS loop. In general, FIG. 3C shows the implementation of the adaptive filter (LMS) 214 while connected to the rest of the components of FIG. 3B. In other words, the LMS interference cancelling algorithm is changed due to the added feedback from node y[n] to node d[n], and hence the algorithm can no longer perform its intended role. This change introduces two problems: the first problem is that node d[n] gets converted into an error node e[n] when the algorithm runs for some time. This occurs because the error node is defined as e[n]=d[n]−y[n] which is natively forced in the FIG. 3A topology because the amplifier performs continuous subtraction. The second problem is the offset at the output of the amplifier will disappear over time since it is subtracted from the input of the neural amplifier, so the LPF will produce zero output at some point in time; this will force node u[n] to be zero, which disturbs the stability of the filter and causes an incorrect interference cancellation mechanism.

FIG. 3B shows the dynamics of the adaptive filter 214 of FIG. 2, which performs the addition the output signal of the AF, y[n], which carries the EOV value, to both nodes u[n] and d[n] to cancel the subtraction effect of the neural amplifier. The FIG. 3B approach can reach its full accuracy and conversion speed capability when deployed with a differential amplifier. The dynamics of the adaptive filter (LMS) 214 with the additional loops illustrated in FIG. 3B ensures reduced conversion errors compared to the approach in FIG. 3A.

Figure 4:
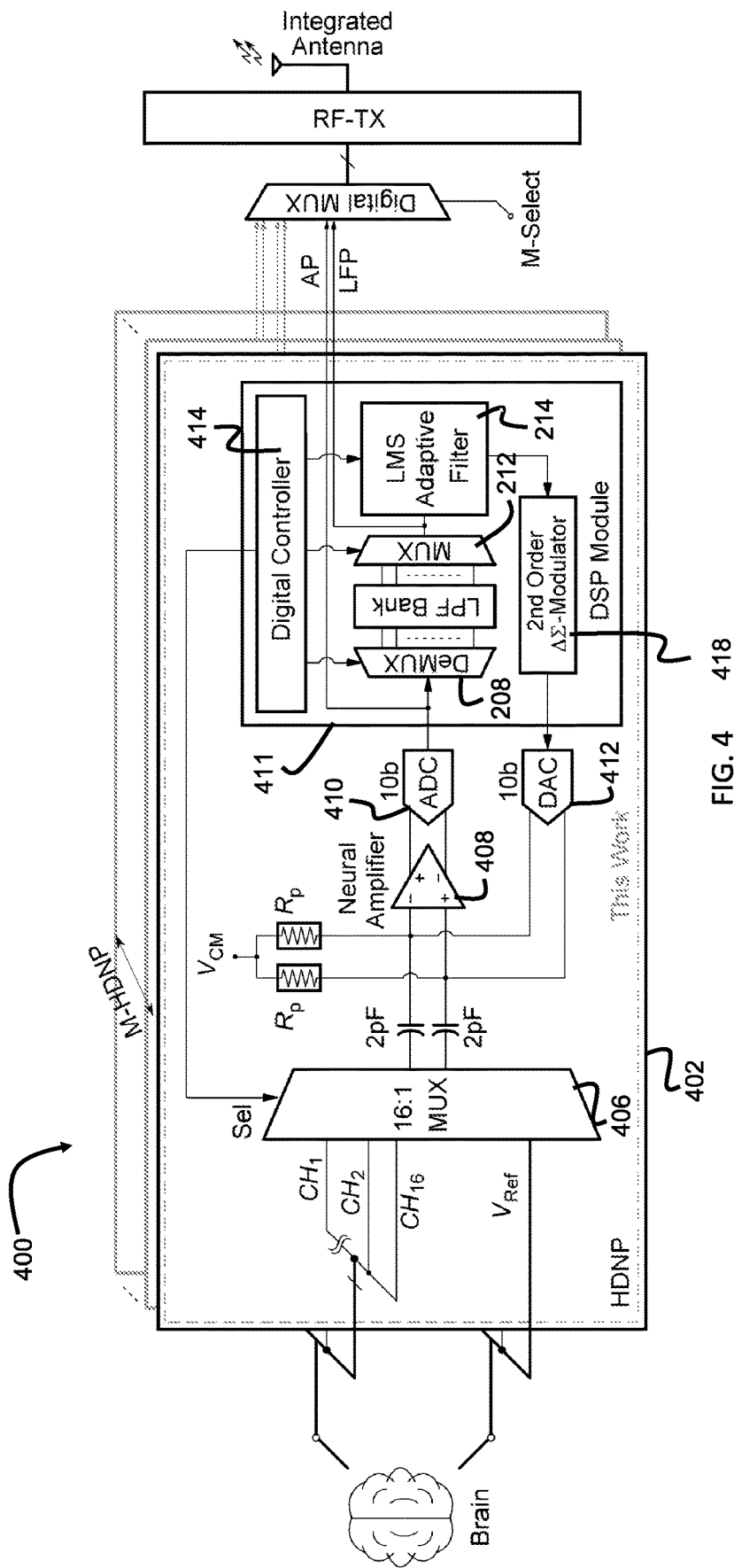
FIG. 4 shows a preferred embodiment neural recording system.

A preferred configuration for a LMS 302 is shown in FIG. 3C. An additional unit-delay block 304 is inserted after the node y[n] for signal timing flow consistency of the LMS loop 302 in a TDMA system. The unit-delay block represents the behavior of the unit delay 206a in the ADC 206, and serves to provide timing consistency. Finally, saturation blocks 306 are inserted at the input of the nodes u[n] and d[n] to avoid algorithm overflow at system startup which helps with LMS conversion and locking to the correct w[n] value FIG. 4 shows a preferred embodiment neural recording system 400. The system is composed of a HDNP 402, a highspeed digital MUX 406 (corresponding to MUX 202 in FIG. 2), and an RF-Module with integrated antenna. Each HDNP block consists of 16 fully differential input recording channels: a 16:1 analog multiplexer combines the neural signals onto an AC-Coupled fully differential neural amplifier 408 which is biased by pseudo resistors, $R_p$. A 10-bit SAR ADC 410 digitizes each code and passes it to an on-chip DSP module 411 for EOV estimation. The DSP 411 passes the continuously updated estimates to a 10-bit CDAC 412 which performs electrode EOV cancellation in the current domain. The neural amplifier 408 is left in an open loop configuration to eliminate any feedback passive devices that may increase the area. The gain and bandwidth, however, are adjustable and can be optionally controlled by the digital module to overcome process variations if needed.

The neural amplifier 408 is AC-Coupled after the multiplexer 406 for two main reasons: (1) to properly bias the neural amplifier without recourse to EOVs; and (2) to convert the input voltage into the current domain for EOV subtraction. If the amplifier were DC-Coupled, then $R_p$ must be much less than the electrode resistive impedance to correctly bias the amplifier. However, the lower $R_p$ gets, the higher the signal losses become due to the potential division between the electrodes and the amplifier input impedance. On the other hand, if the capacitors are increased, the input signal will be less attenuated, but this trades off with the analog module area which will increase. In addition, it attenuates the CDAC 412 cancelling signal which sees a potential divider between the DAC capacitors, the amplifier input device parasitic capacitance and the AC-Coupling capacitance. This limits the magnitude of the offset cancellation signal to ±65 mV if the CDAC is supplied by 1.2V.

Since the DAC 412 needs to cover the full dynamic range of both the EOV and the small neural signal, the ENOB requirement is relatively high at 15-bit. Therefore, the CDAC is implemented as a second order ΔΣ-Modulator 418, designed as an error-feedback noise-shaping loop to reduce the DAC's actual bit-width from 15-bit to 10-bit. Although the ΔΣ-Modulator requires additional power compared to the corresponding DAC 218 in FIG. 2, the reduced bit-width offers more savings in terms of DAC area and eases the matching requirement of unit DAC elements. The second order ΔΣ-Modulator has an oversampling ratio of 32; this makes the highest digital clock required to operate the system to be 10.24 MHz.

Finally, the open-loop amplifier saves area by eliminating the need for passive component feedback and instead running open loop; however, the offset caused by the mismatch of the amplifier input differential pairs can easily cause saturation. Fortunately, the digital signal processors can natively recover from the amplifier input referred offset.

The input impedance of the HDNI AFE system should be designed to be much higher than the electrode impedance to avoid signal attenuation, due to potential division, at the system input interface. Since the implantable electrode sizes are expected to be very small as the number of recording channels increase, the electrode impedance is expected to increase as well. This poses a design challenge on the overall AFE. FIGS. 5A-5C compare input impedance simulation results of a chopper-based AFE versus a different number of TDMA-based AFEs. For a fair comparison, assume that the differential voltage applied on $C_{IN}$ capacitors change from rail-to-rail at each cycle in chopper-based AFE shown in FIG. 5A, and at each channel selection change in the TDMA-based AFE shown in FIG. 5B; this ensures the lowest input impedance possible for both systems. In a chopper-based AFE, the charge supplied within a one clock period ($1/f_s$) is ($Q=2C_{IN}V_{IN}$), which gives an average input current of $I_{IN,Avg}=Q/T_S$. Accordingly, the average differential input impedance at relatively low frequencies can be expressed as ($Z_{IN}=V_{IN}/I_{IN,Avg}=\frac{1}{2}f_S C_{IN}$). On the other hand, the charge supplied to any selected channel in the TDMA-based system in a single period of the clock ($f_S$) is half the value of the chopper-based AFE. Accordingly, the lowest differential input impedance for a TDMA-based system at relatively low frequencies can be expressed as $Z_{IN}=1/f_S C_{IN}$. Since the change in voltage between any two consecutive channels in TDMA-based AFE is random, the input impedance can be higher than the given expression. Recent development of implantable μECoG in shows that the impedance of a 100 μm-diameter coated CNT is 100 kΩ. This gives the TDMA-based systems input impedance a promising compatibility of high-density implantable electrodes.

The DSP module 411 includes a digital controller 414 (FIG. 4) which regulates the channel selection of the analog MUX 406, digital MUX 214 and digital DEMUX. In addition, it samples the LMS filter weight and switches off the digital multiplier M1 (FIG. 3C) to save power in case the filter weight remains within a programmable range of ±2 digits for 10 seconds.

For EOV cancellation, the digitized neural signal gets demultiplexed first and passes through a digital LPF for each channel separately. The LPF architecture used in this work is a delay-free digital integrator. Both the EOV and LFP gets extracted and then the signals get multiplexed again to form a reference signal for the LMS algorithm. The interference-cancelling LMS-AF senses the raw neural signals from the ADC and EOV/LFP reference signal and computes the exact EOV/LFP voltage level to be removed from the neural amplifier input summing node.

The LMS algorithm in the digital module has u value set to $2^{-34}$; this value is considered a good balance in terms of speed and offset removal accuracy for the overall system.

Figure 6A:
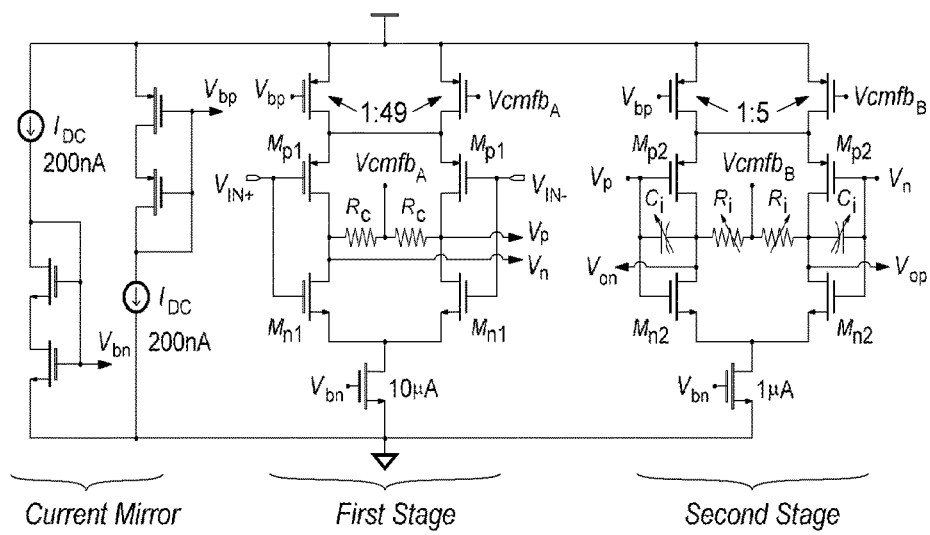
FIG. 6A shows a circuit details of a prototype fabricated neural amplifier that implements 204/408 of FIGS. 2 and 4, respectively.

FIG. 6A shows a circuit details of a prototype fabricated neural amplifier that implements 204/408 of FIGS. 2 and 4, respectively. It consists of a two-stage complimentary-input amplifier since it provides a low noise and high gain-bandwidth product compared to a non-complimentary and telescopic-cascode amplifiers. Fan Zhang, Jeremy Holleman, and Brian P. Otis, "Design of Ultra-Low Power Biopotential Amplifiers for Biosignal Acquisition Applications," *IEEE TBCAS*, vol. 6, no. 4, pp. 344-355 m (2012). The overall approximate mid-band gain is given by:

$$A_{vd} \approx (gm_{Mn1} + gm_{Mp1})(ro_{Mn1}\|ro_{Mp1}) \times (gm_{Mn2} + gm_{Mp2})(ro_{Mn2}\|ro_{Mp2}\|Ri)$$

whereas the approximate bandwidth is $\frac{1}{2\pi RiCi}$.

The PMOS current tails are divided into bleeders to avoid latching at startup. CMFB current sources are fed by pseudo-resistors directly without a CMFB amplifier. This topology reduces the loop gain of the CMFB which increases stability in the open-loop configuration in addition to saving area and power. The second stage has an optional bank of Miller-capacitors and resistors to linearly adjust the GBW of the amplifier using 3-bit digital controllers each if needed. The total capacitance is 280 fF on each differential output, resulting in BW variation from 210 kHz to 830 kHz when operating with the 40 dB gain setting. This range was chosen to cover any process variations after fabrication such that the exact desired bandwidth would be set to 320 kHz. The resistive bank varies the amplifier gain linearly from 35 dB to 52 dB with a 3-bit controller. However, for a 10-bit accuracy To achieve the lowest noise and area from the AFE, the employed circuit topology should be carefully considered. The analog multiplexer consists of thick-oxide NMOS switches of size 6×0.28 μm² with a corresponding typical resistance of 320Ω and input referred noise of 0.3μ $V_{rms}$. With small switch size and thick-oxide, the charge injection and clock feedthrough are not significant given the 2 pF input AC-coupling capacitance and typical electrode double layer capacitance of (~1 nF).

Figure 6B:
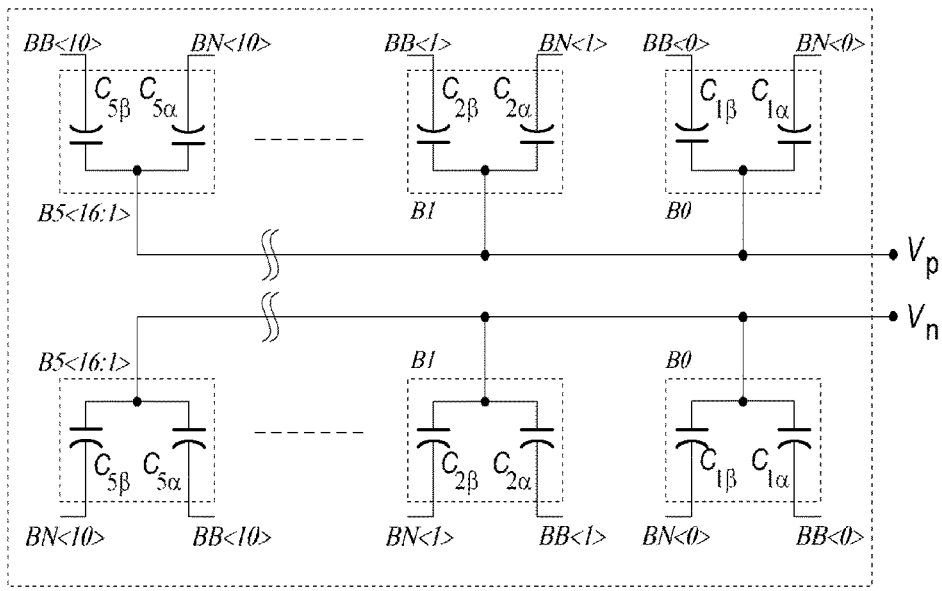
FIG. 6B shows a segmented charge-redistribution circuit topology that can be used in both the DAC 218 and the ADC 206.

To save more power and energy, the segmented charge-redistribution circuit topology shown in FIG. 6B is used in both the DAC 218/412 and the ADC 206/410 with slight differences between the two. It is built out of metal parasitic capacitance. The DAC unit capacitors $C_\alpha + C_\beta$ equal 8.2 fF in all combinations. $C_{1\alpha}$ and $C_{1\beta}$ are 4 fF and 4.2F, while $C_{2\alpha}$ and $C_{2\beta}$ are 3.9 fF and 4.3 fF, respectively. The first five LSB differential capacitor blocks (B0→B4) are binary weighted. The remaining 5-MSBs (B5-B9) are thermometer weighted, with $C_{5\alpha}$ and $C_{5\beta}$ set to 0.9 fF and 7.3 fF, respectively. Each capacitor block is controlled by a differential binary input BN and BB on its bottom plate; hence the effective unit capacitance is 0.2 fF.

Figure 6C:
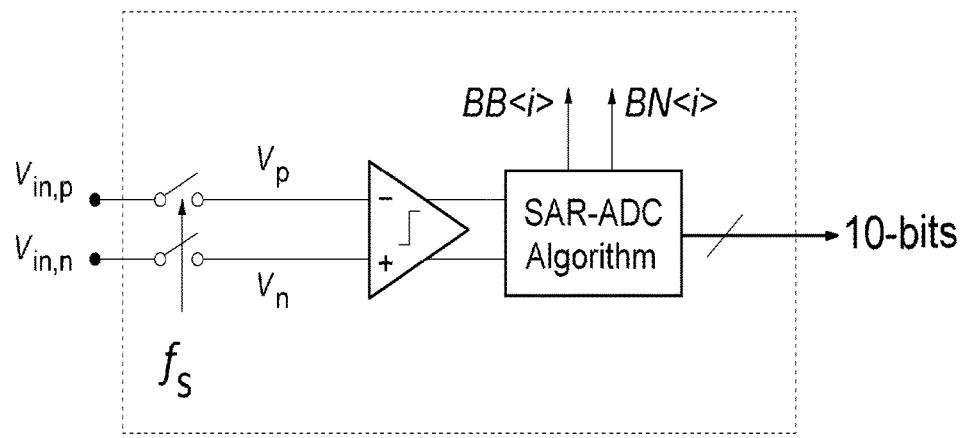

FIG. 6C shows a conventional 10-bit asynchronous SAR ADC algorithm used in a preferred implementation of the system. Unlike the DAC capacitor-bank topology the SAR ADC uses 9-capacitance blocks only instead of 10 block.

With the DAC having 8.2 fF×36 total equivalent capacitance ($C_{DAC}$), CMOS input parasitic capacitance ($C_{INP}$) of 0.25 pF, and 2 pF AC coupling capacitors ($C_{AC}$); the neural and DAC signals gets attenuated by $$\Gamma_{Neural\,Signal} = \frac{C_{AC}}{C_{AC} + C_{INP} + C_{DAC}} \qquad (2)$$

$$\Gamma_{DAC} = \frac{C_{DAC}}{C_{AC} + C_{INP} + C_{DAC}} \qquad (3)$$

which results in $\tau_{Neural\ Signal}=0.78$ and of $\tau_{DAC}=0.1$.

Assume a $V_{DD}$ of 1.2V, the maximum DAC cancellation capability reaches ±69.5 mV. Monte Carlo simulation results show that the input referred offset can be as high as 4.5 mV, this gives an EOV cancellation margin of ±65 m V which is sufficient to prevent the neural amplifier from saturation from common electrode types.

The preferred neural recording system IC consistent with FIGS. 6A-6C was fabricated in 65 nm 1p9 m LP CMOS technology. The total area of the 16 channels was 0.0397 mm², including all analog and digital blocks. The analog module consumed 13.8 μA/16 Ch from a 1.2V supply, while the digital module used 37.5 μA/16 Ch from a 1 V supply. The entire IC power consumption is 54.06μW for all 16 Channels.

The measured input impedance $Z_{IN}$ at 100 Hz is 28 MΩ, which is very close to the expected worst-case input impedance. The lowest measured CMRR and PSRR are 66 dB and 79 dB, respectively. This is measured while injecting ±50 mV slowly varying offsets to all channels and observing CH6 and CH14 for the ripple amplitude. For the standalone ADC, the measured SNR is 50.79 dB and SNDR is 50.16 dB resulting in ENOB of 8.04 bits. The ADC third harmonic distortion THD is 0.146%. The overall system measured SNR with ±50 m V injected EOV is 46.96 dB, and SNDR is 46.29 dB, resulting in ENOB of 7.4 bits.

Measurements of 5 different dies show that the neural amplifier mid-band gain mean value is 40 dB with a standard deviation of 4.12 dB, and bandwidth mean of 397 kHz with 194.1 Hz standard deviation, respectively. The worst-case measured EOV rejection is 53 dB. System power consumption is 3.38μW/Ch, and the input referred noise is 2.6μ Vrms, which gives an NEF of 1.83. The overall per-channel area is 0.00248 mm², of which 68% is digital area which is highly scalable with node technology.

Figures 7A, 7B:
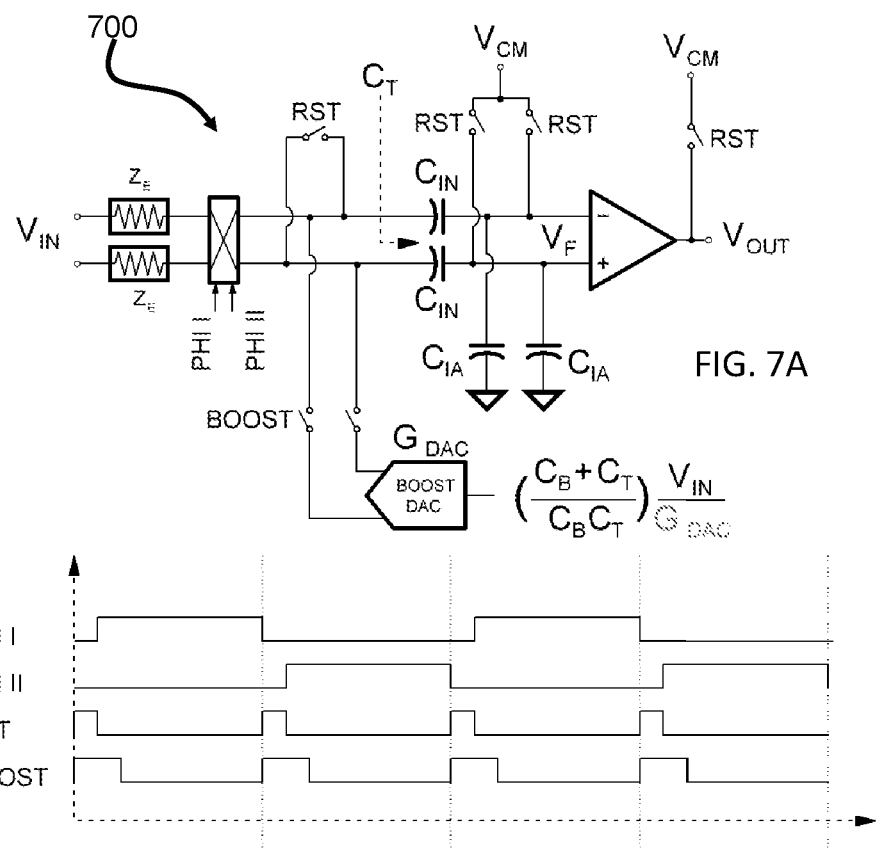
FIGS. 7A and 7B respectively show a preferred impedance booster circuit and associated waveforms.

To further reduce IRN, a chopper IA can be utilized. However, the AFE input impedance will get degraded according to the formula $Z_{IN}=\frac{1}{2} f_{CH}C_{IN}$. To boost the input impedance, a preferred impedance booster circuit 700 is shown in FIG. 7A, and associated waveforms in FIG. 7B. With a high electrode impedance, the resistivity of the impedance-booster to the AFE input capacitors will be orders of magnitude less that the resistivity from the electrodes to the input capacitors The current can be supplied from the impedance-booster module 700, which will cause the overall AFE input impedance to increase. A multiplication factor of capacitance division between the DAC ($C_B$) and the total AFE capacitance ($C_T$) is taken into consideration, as well as the DAC attenuation factor $G_{DAC}$. A reset phase is also added to avoid unnecessary charge sharing between the DAC and IA capacitances. Overall, FIG. 7A illustrations high-level impedance booster requirements. With neural electrodes of impedance $Z_E$, a chopper amplifier, a feedback DAC; the input impedance can be boosted if the chopper amplifier input AC capacitors are pre-charged with the input signal prior to connecting it to the electrodes. However, since the electrodes impedance provides a much higher resistive path from the electrodes to the IA compared to the path from the DAC to the IA, the impedance booster module can be switched ON at the beginning of the signal sensing phase. This will force the input AC capacitors $C_{IN}$ to withdraw the current from the booster module instead of the electrodes. The predicted input signal can simply be determined by the DAC gain ($G_{DAC}$), the predicted previous input voltage ($V_{IN}$) and the potential division between the AC coupling cap in series plus the IA input parasitic capacitance, defined as the total input capacitance $C_T$ and the DAC capacitance $C_B$. The RST switch is necessary to avoid any charge sharing issues between the DAC and $C_T$.

Figure 8:
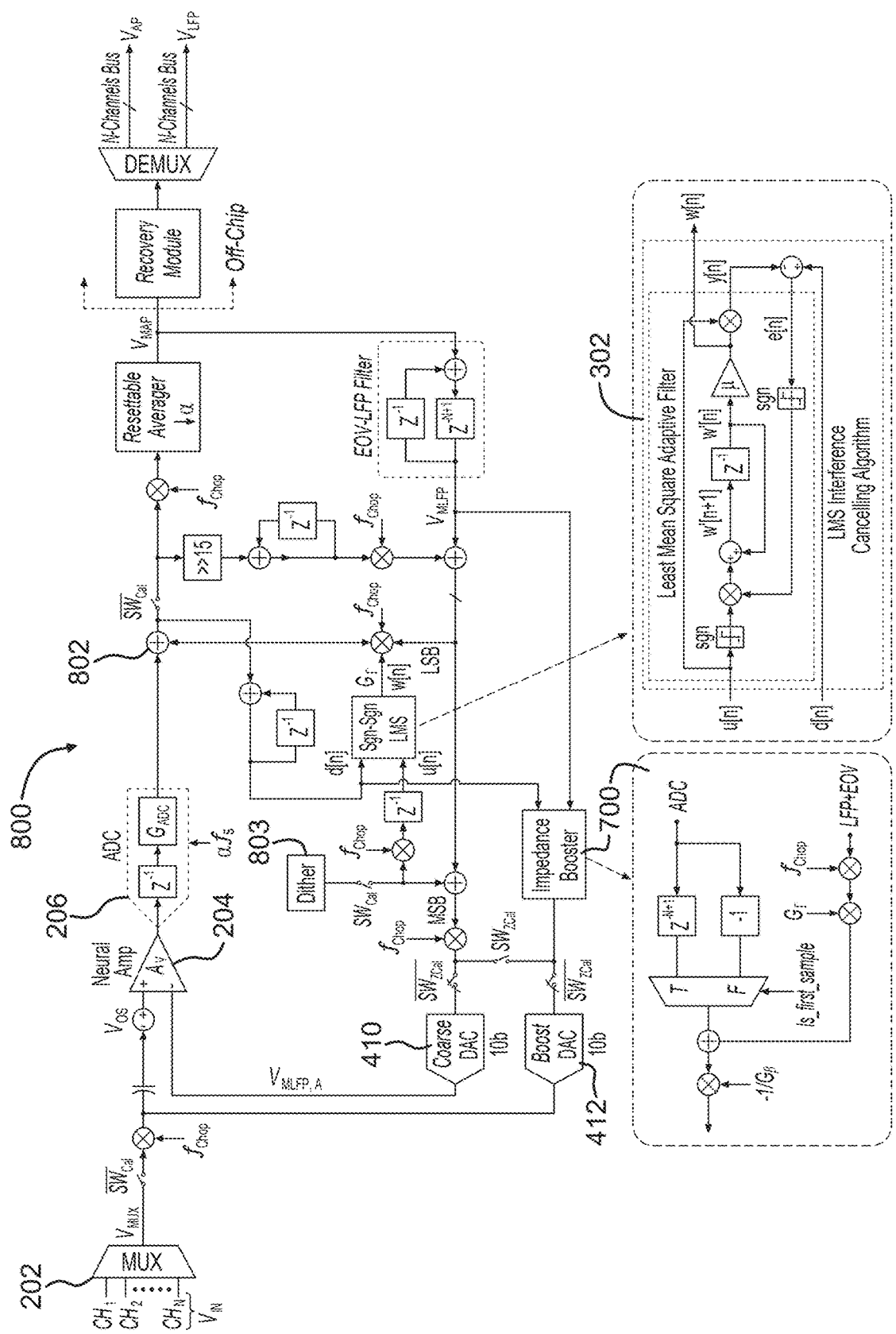
FIG. 8 shows a preferred TDMA neural recoding system with choppers to reduce the IRN.
Figure 9A:
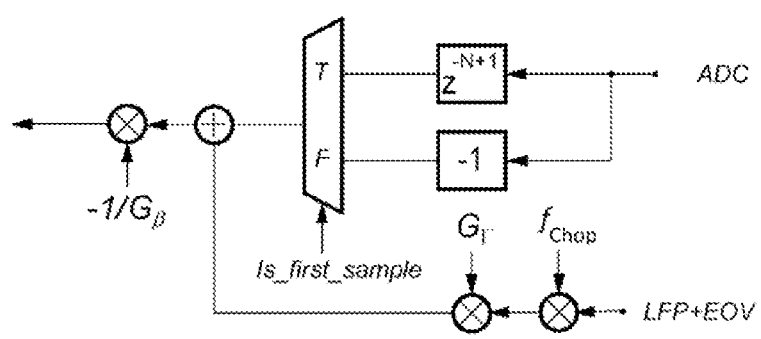
FIGS. 9A and 9B respectively show a simplified representation of the impedance booster module 700 and its timing diagram.

FIG. 8A shows a preferred TDMA neural recoding system with choppers to reduce the IRN 800 with the impedance booster module 700 and a chopper-amplifier 204. A digital accumulator 802 is used to remove any static offset from the chopper-amplifier 204. In addition, a sgn-sgn LMS module 302 with a dither injection module 803 to determine the loop gain starting from the input of the chopper amplifier 204, through the ADC 206, the DAC 410/412 and back to the amplifier 204. $G_r$ is determined when the dither is injected through the DAC 410, whereas Gg is determined when the dither is injected through 412. In 800, the digital MUX and DEMUX are no longer necessary; instead the proposed EOV-LFP filter 804 is used which saves silicon area by removing on-chip modulation/demodulation. FIG. 9A shows a simplified representation of the impedance booster module 700 and its timing diagram is in FIG. 9B. The impedance booster module needs to predict the input signal of the chopper amplifier 204. Assuming that each channel is sampled 8-times and chopped, it is okay to assume that the input signal to the neural amplifier does change much at a sampling frequency of 10.24 MHz. Accordingly, within the sampling of i-th channel, each sample can be assumed to be the −1 multiplication of the previous sample due to the chopping nature of the system. However, the first sample of i-th channel can only be assumed from the last known value of this i-th channel; for this reason, an N−1 delay units are added. To determine the value of $V_{IN}$, one can utilize the ADC output voltage, which is known to be, $$V_{ADC-Out} = G_\beta \left( \frac{V_{IN}}{G_{DAC,Boost}} \right) - G_T V_{LFP+EOV}$$

where $G_\beta = G_{DAC,\ Boost} \times A_V \times G_{ADC}$. Accordingly, the voltage on the input capacitors can be written as, $$V_{IN} = \frac{V_{ADC-Out} + G_T V_{LFP+EOV}}{G_\beta} G_{DAC,Boost}$$

Figure 9B:
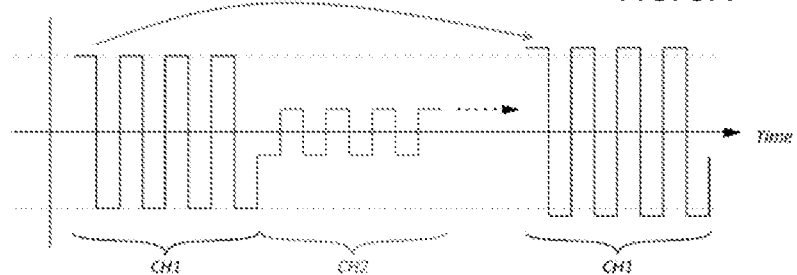

$G_\beta$ can be determined by injecting a dither sequence during the initial calibration phase and determining it by the Sgn-Sgn LMS algorithm. FIG. 9B shows an example of the neural signal during operation. During the recoding of any $i^{th}$-channel, there is a negative sign caused by the nature of the chopped signal. Additionally, the very first sample of each channel can be known from the previously recorded sample which is delayed by N−1 times in the booster module; this gives a total of N-delays since the ADC adds an additional unit delay. Hence, a digital multiplexer either passes the recorded ADC through −1 multiplication or N−1 unit delay.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An integrated digitally assisted neural recording system comprising:
    an analog multiplexer structured to receive N-channels and to multiplex the N-Channels into a single neural amplifier;
    an analog to digital converter configured to convert a signal from the neural amplifier;
    a demultiplexer configured to separate a digital output of the analog to digital converter back into the N-channels; and
    a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain, wherein the feedback loop comprises an adaptive filter that initially sets at a gain value that saturates the feedback loop and automatically decreases gain to a largest possible value that guarantees electrode offset voltage cancellation.

2. The neural recording system of claim 1, wherein the feedback loop comprises a low pass filter that filters output of the demultiplexer to provide a sum of local field potential and electrode offset signals.

3. The neural recording system of claim 2, wherein low frequency signals from the low pass filter are multiplexed, aligned and converted into the analog domain by a digital to analog converter in the feedback loop.

4. The neural recording system of claim 1, comprising a high-density neural implant providing the N-channels and an RF module with integrated antenna that transmits a signal produced by the demultiplexer.

5. The neural recording system of claim 1, comprising an AC coupling circuit between the multiplexer and the neural amplifier.

6. The neural recording system of claim 1, wherein the feedback loop comprises an adaptive filter, the system comprising a digital signal processor configured to control the adaptive filter.

7. The neural recording system of claim 1, comprising circuitry to extract a neural signal local field potential and action potential through time division multiple access processing.

8. The neural recording system of claim 1, wherein the neural amplifier comprises an open loop amplifier.

9. An integrated digitally assisted neural recording system comprising:
    an analog multiplexer structured to receive N-channels and to multiplex the N-Channels into a single neural amplifier;
    an analog to digital converter configured to convert a signal from the neural amplifier;
    a demultiplexer configured to separate a digital output of the analog to digital converter back into the N-channels; and
    a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain, wherein the feedback loop comprises a low pass filter that filters output of the demultiplexer to provide a sum of local field potential and electrode offset signals.

10. The neural recording system of claim 9, wherein low frequency signals from the low pass filter are multiplexed, aligned and converted into the analog domain by a digital to analog converter in the feedback loop.

11. An integrated digitally assisted neural recording system comprising:
    an analog multiplexer structured to receive N-channels and to multiplex the N-Channels into a single neural amplifier;
    an analog to digital converter configured to convert a signal from the neural amplifier;
    a demultiplexer configured to separate a digital output of the analog to digital converter back into the N-channels;
    a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain; and
    an AC coupling circuit between the multiplexer and the neural amplifier, wherein the AC coupling circuit is configured to bias the neural amplifier and convert the multiplexer output into the current domain.

12. An integrated digitally assisted neural recording system comprising:
    an analog multiplexer structured to receive N-channels and to multiplex the N-Channels into a single neural amplifier;
    an analog to digital converter configured to convert a signal from the neural amplifier;
    a demultiplexer configured to separate a digital output of the analog to digital converter back into the N-channels; and
    a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain, wherein the feedback loop comprises an adaptive filter and a capacitive digital to analog converter that is not clocked, with N-unit delays before the capacitive digital to analog converter that add the delay to delay to align each electrode offset voltage sample to be subtracted at the neural amp in the analog domain.

13. An integrated digitally assisted neural recording system comprising:
    an analog multiplexer structured to receive N-channels and to multiplex the N-Channels into a single neural amplifier;
    an analog to digital converter configured to convert a signal from the neural amplifier;
    a demultiplexer configured to separate a digital output of the analog to digital converter back into the N-channels; and
    a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain, wherein the feedback loop comprises an adaptive filter and a $\Delta 93$-Modulator digital to analog converter that provides the offset voltage sample to be subtracted at the neural amp in the analog domain.

14. An integrated digitally assisted neural recording system comprising:

an analog multiplexer structured to receive N-channels and to multiplex the N-Channels into a single neural amplifier;

an analog to digital converter configured to convert a signal from the neural amplifier:

a demultiplexer configured to separate a digital output of the analog to digital converter back into the N-channels; and a feedback loop from the demultiplexer to the neural amplifier, the feedback loop being configured to cancel electrode offset voltage by generating electrode offset voltage samples and adding delay to align each electrode offset voltage sample to be subtracted at the neural amplifier in the analog domain, wherein the neural amp comprises an AC-Coupled fully differential neural amplifier, the system further comprising an impedance booster circuit configured to boost the neural amplifier impedance and configured to be switched ON at the beginning of a neural signal sensing phase.

* * * * *